No. 746,826. PATENTED DEC. 15, 1903.
N. A. GRIFFIN.
PLOW.
APPLICATION FILED SEPT. 3, 1903.

NO MODEL.

Witnesses
E. K. Stewart
Wm. Bagger

Nathaniel A. Griffin, Inventor
by C. A. Snow & Co.
Attorneys

No. 746,826. Patented December 15, 1903.

UNITED STATES PATENT OFFICE.

NATHANIEL A. GRIFFIN, OF COOLIDGE, GEORGIA.

PLOW.

SPECIFICATION forming part of Letters Patent No. 746,826, dated December 15, 1903.

Application filed September 3, 1903. Serial No. 171,819. (No model.)

*To all whom it may concern:*

Be it known that I, NATHANIEL A. GRIFFIN, a citizen of the United States, residing at Coolidge, in the county of Thomas and State of Georgia, have invented a new and useful Plow, of which the following is a specification.

This invention relates to plows and similar cultivating implements; and it has for its object to produce a device of this class embodying a plurality of plow-beams, each carrying a standard, and incidentally a plow or suitable cultivating implement of any desired size or shape.
My invention relates especially to certain improved means whereby the said beams may be connected adjustably with each other and held securely in the positions to which they may be adjusted and to means whereby the implement may be connected with a draft appliance.

With these and other objects in view my invention consists in the improved construction, arrangement, and combination of parts which will be hereinafter fully described, and particularly pointed out in the claims.

In the accompanying drawings I have illustrated a form of embodiment of my invention, presenting the same in a simple and preferred form, it being understood, however, that changes may be made within the scope of my invention as to the shape, size, or exact manner of assemblage of the parts of the device without departing from the spirit or sacrificing the efficiency thereof.

Figure 1:
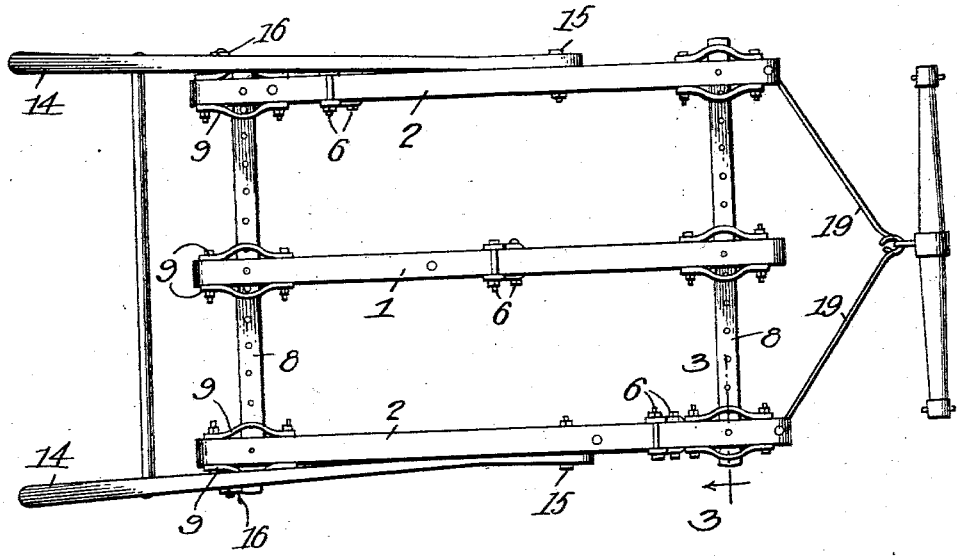
Figure 2:
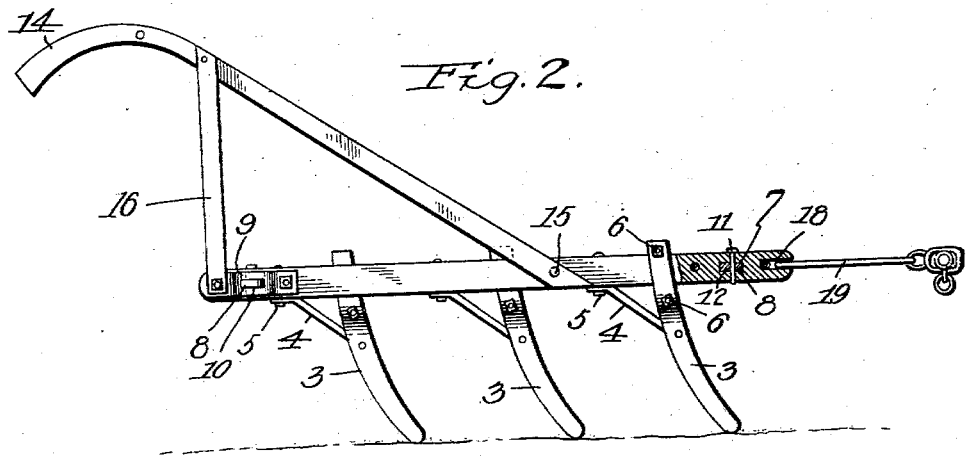
Figure 3:
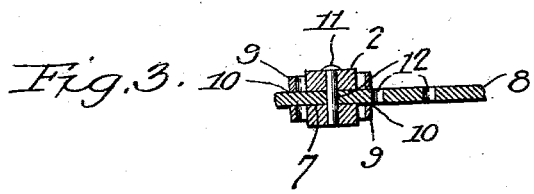

In said drawings, Figure 1 is a plan view of an implement constructed in accordance with the principles of my invention. Fig. 2 is a side elevation of the same. Fig. 3 is a vertical sectional view taken on the line 3 3 in Fig. 1.

Corresponding parts in the several figures are indicated by similar numerals of reference.

In the present instance I have shown my improved implement as composed of three beams—namely, a center beam 1 and outer or side beams 2 2. Each of these beams carries a stock 3, which is of the ordinary bifurcated pattern and which is connected by a brace 4 and a bolt 5 with the beam upon which it is mounted. The upper ends of the stocks are clamped upon the respective beams by means of clamping-bolts 6. Each of the beams 1 and 2 is provided near its front and rear ends with horizontally-disposed transverse slots 7 to accommodate the spacing and connecting bars 8, which latter are preferably composed of flat iron straps of suitable dimensions to sustain the strain to which they will in practice be subjected. Each of the several beams is provided with reinforcing-plates 9, one of which is secured to each side of each beam adjacent to each of the transverse slots 7, said reinforcing-plates being provided with slots 10, which are in alinement with the said slots 7. These reinforcing-plates are bulged outwardly, as plainly indicated in Fig. 1 of the drawings, so that the slotted parts of said reinforcing-plates shall be disposed at a distance from the adjacent sides of the beam. This is for the purpose of forming extended bearings for the connecting-straps 8, which thus, as well as engaging the wooden beams, will engage the metallic reinforcing-plates, the engaging portion being extended over a width equal to the distance between the outer sides of oppositely-disposed reinforcing-plates. By this construction the parts may be connected with considerable stiffness and rigidity, whereby the complete implement may be guided without swerving, which is not always the case when the parts of the device are loosely jointed together. At the same time adjustment of the parts of the device with relation to each other may readily be had at any time by means of pins or bolts 11, which extend vertically through the beams and through perforations 12 in the connecting-bars 8. The latter may be of any desired length to allow for the extreme distance between the outer beams, and they are provided each with a plurality of perforations, which enables the said beams to be conveniently adjusted in any desired relation to each other. The frame of my improved implement thus consists of the beams, the stocks or standards carried by said beams, and the connecting means for the latter. In addition to these are provided handles 14, which are connected with the outer beams by means of bolts 15 and braces 16, which connect the handles with the rear ends of the beams. The handles are also connected in the usual manner by means of a rung 17.

The front ends of the outer beams 2 2 are provided with horizontally-disposed recesses 18, in which are pivotally mounted links 19, converging forwardly, as shown, and at the front ends of which the draft may be applied in the usual well-known manner.

My improved plow or cultivating implement is, as will be seen, extremely simple in construction, and it may be manufactured at a moderate expense. At the same time it constitutes a gang-plow by means of which several furrows may be simultaneously turned or, if used for cultivating purposes, several rows may be simultaneously operated upon.

Having thus described my invention, I claim—

1. In an implement of the class described, a plurality of beams having horizontally-disposed slots near their front and rear ends, bulged, outstanding reinforcing-plates disposed adjacent to said slots and having slots in alinement therewith, connecting-bars extending through the slots of the beams and reinforcing-plates and having perforations, and connecting-bolts.

2. In an implement of the class described comprising a plurality of beams adapted to be connected adjustably by means of transverse bars, said beams being provided with slots for the passage of said bars, outstanding, bulged reinforcing-plates secured to the sides of said beams adjacent to each of the slots therein, said reinforcing-plates being provided with slots alining with those in the beams.

In testimony that I claim the foregoing as my own I have hereto affixed my signature in the presence of two witnesses.

NATHANIEL A. GRIFFIN.

Witnesses:
L. SMITH,
R. M. BALES.